(12) United States Patent
Raghavan et al.

(10) Patent No.: US 11,941,070 B2
(45) Date of Patent: Mar. 26, 2024

(54) SYSTEMS AND METHODS FOR MANAGED ASSET DISTRIBUTION IN A DISTRIBUTED HETEROGENEOUS STORAGE ENVIRONMENT

(71) Applicant: OPEN TEXT SA ULC, Halifax (CA)

(72) Inventors: Srikanth Raghavan, Ashburn, VA (US); Michael Scott, Washington Grove, MD (US)

(73) Assignee: OPEN TEXT SA ULC, Halifax (CA)

( * ) Notice: Subject to any disclaimer, the term of this patent is extended or adjusted under 35 U.S.C. 154(b) by 0 days.

(21) Appl. No.: 18/078,753

(22) Filed: Dec. 9, 2022

(65) Prior Publication Data

US 2023/0104883 A1 Apr. 6, 2023

Related U.S. Application Data

(63) Continuation of application No. 17/005,119, filed on Aug. 27, 2020, now Pat. No. 11,574,025, which is a (Continued)

(51) Int. Cl.
*G06F 16/00* (2019.01)
*G06F 16/14* (2019.01)
(Continued)

(52) U.S. Cl.
CPC .......... *G06F 16/951* (2019.01); *G06F 16/148* (2019.01); *G06F 16/164* (2019.01);
(Continued)

(58) Field of Classification Search
CPC ...... G06F 16/148; G06F 16/164; G06F 16/27; G06F 16/951
See application file for complete search history.

(56) References Cited

U.S. PATENT DOCUMENTS 10,154,300 B2 * 12/2018 Kemal ................ H04L 67/1097
2004/0225612 A1 * 11/2004 Shimojima ........ G11B 20/0021
705/57

OTHER PUBLICATIONS

Arun Sen, "Metadata Management: Past, Present and Future," www.sciencedirect.com, Decision Support Systems, 2004, pp. 151-173. (Year: 2004).*

(Continued)

*Primary Examiner* — Cheryl Lewis
(74) *Attorney, Agent, or Firm* — SPRINKLE IP LAW GROUP

(57) ABSTRACT

Embodiments of systems and methods for the rules based distribution of managed content across heterogeneous storage distributed in a network environment are disclosed. In particular, certain embodiments may employ entity rules in association with a content management system. An entity rule may be a rule specifying a set of parameters and a destination secondary storage location. When the entity rule is evaluated by the content system, a set of content managed by the content management system responsive to the rule may be determined using the parameters of the rule. Responsive content can be determined, for example, by searching the content of the content management system based on the parameters. Responsive content may be moved from the primary storage location of the content management system to the secondary storage location specified by the entity rule.

21 Claims, 11 Drawing Sheets

Related U.S. Application Data continuation of application No. 15/955,334, filed on Apr. 17, 2018, now Pat. No. 10,853,425.

(60) Provisional application No. 62/487,820, filed on Apr. 20, 2017.

(51) Int. Cl.
*G06F 16/16* (2019.01)
*G06F 16/27* (2019.01)
*G06F 16/951* (2019.01)
*G06F 16/953* (2019.01)

(52) U.S. Cl.
CPC ............ *G06F 16/27* (2019.01); *G06F 16/278* (2019.01); *G06F 16/953* (2019.01)

(56) References Cited

OTHER PUBLICATIONS

Linaza et al., "Mash-Up Applications for Small Destination Management Organizations Web Sites," Information and Communication Technologies in Tourism, 2008, Selected Readings in Computer Graphics, pp. 130-140. (Year: 2008).*

* cited by examiner

OPENTEXT™ | Media Management Administration     admin. otmm

| Metadata ▶ | Security ▶ | Users ▶ | Templates ▶ | Utilities ▶ | YouTube ▶ | Configurations ▶ | Analytics | Storage Management |

Intelligent Storage Management

| Content Managers | Business Rules |

[ New content manager ]

| Name | Storage provider | Storage type | Actions |
|---|---|---|---|
| Amazon S3 | Cloud | Default | Edit |
| Azure Blob | Cloud | Default | Edit |
| Filesystem | SAN/NAS | Default | Edit |
| Google Cloud | Cloud | Default | Edit |

SYSTEMS AND METHODS FOR MANAGED ASSET DISTRIBUTION IN A DISTRIBUTED HETEROGENEOUS STORAGE ENVIRONMENT

RELATED APPLICATIONS

This application is a continuation of, and claims a benefit of priority under 35 U.S.C. 120 of, U.S. patent application Ser. No. 17/005,119, filed Aug. 27, 2020, entitled "SYSTEMS AND METHODS FOR MANAGED ASSET DISTRIBUTION IN A DISTRIBUTED HETEROGENEOUS STORAGE ENVIRONMENT", now U.S. Pat. No. 11,574,025 which is a continuation of, and claims a benefit of priority under 35 U.S.C. 120 of, U.S. patent application Ser. No. 15/955,334 filed Apr. 17, 2018, entitled "SYSTEMS AND METHODS FOR MANAGED ASSET DISTRIBUTION IN A DISTRIBUTED HETEROGENEOUS STORAGE ENVIRONMENT," now U.S. Pat. No. 10,853,425, which claims the benefit of priority under 35 U.S.C. 119 to U.S. Provisional Patent Application Ser. No. 62/487,820 filed Apr. 20, 2017, entitled "SYSTEM AND METHOD FOR MANAGED ASSET DISTRIBUTION IN A DISTRIBUTED HETEROGENOUS STORAGE ENVIRONMENT", all of which are fully incorporated herein by reference for all purposes.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to the field of content management. Specifically, the disclosure relates to systems and methods for the rules based distribution of managed content across heterogeneous storage locations distributed across a computer network environment. Even more particularly, this disclosure relates to embodiments of systems and methods for the distribution of managed content across heterogeneous storage locations using granular, non-filesystem parameter based rules defining searches.

BACKGROUND

With the ever increasing prevalence and proliferation of electronic content (also referred to as assets) has come a commensurate need for the management of such content. Content management systems do just that, allowing for the management of such content by controlling the access, editing, updating, versioning, etc. of content and allowing users to search for and obtain such content One particular type of content management systems is referred to as media managers or media management systems. These media management systems serve as content management systems for particular types of media content, such as images, videos, audio files, documents, etc. Whether managing media assets or other types of content, this type of content management is in no way trivial. In certain contexts, such as in an enterprise setting, there may be tens of millions of assets that need to be managed, and users may desire to have rapid access to these assets from a variety of distributed access points. While content management systems may have primary storage that may satisfy the user's access requirements, this storage may be prohibitively expensive for storing the millions of large content files often involving petabytes of assets managed by a content management system.

Accordingly, there is a need for improved storage with respect to managed assets and, in particular, a need for fast, efficient storage of managed assets that is also cost efficient and scalable.

SUMMARY

As discussed, content management systems, especially in an enterprise setting, may manage tens of millions (or more) of assets which users may desire to have rapid access to from a variety of distributed access points. To facilitate content management in conjunction with such distributed access, content management systems may be organized around one or more content management servers that provide services and storage associated with the management of such content. Content management servers like these may be deployed in the cloud, or otherwise distributed. These content systems may utilize primary storage (e.g., local, internal or near-line storage) that is usually fast enough to satisfy the user's access requirements with respect to speed. Such storage may, however, be prohibitively expensive for storing the millions of large content files often involving petabytes of assets managed by a content management system.

Users or providers of these content management systems may thus desire to store assets using less costly options such as networked attached storage (NAS) or cloud based storage such as that provided by, for example, Amazon Web Services (AWS) Simple Storage Services, Storage Gateway or Glacier, Google's Cloud Storage, Microsoft Windows Azure Storage, IBM's SmartCloud Enterprise-Object Storage, etc. The use of these other storage options in association with a content management system may, however, present a number of difficulties. One large problem is that the distribution of these assets across a number of other storage locations that may not be under the operation or control of the operator or user of the content management system may add another layer of management complexity to what are already difficult and complex content management tasks.

Moreover, adding to this complexity, these secondary storage locations may be heterogeneous, meaning their interfaces or how they store content may be different both from the primary storage utilized by the content management system and from other secondary storage options. Thus, configuring a content management system to utilize one or more of these secondary storage locations may not be straightforward or universally applicable to other secondary storage locations. Another problem that may present when an attempt is made to use such secondary storage locations in the management of content is that these secondary storage locations may not have the requisite speed needed to satisfy the latency requirements of users of such content management systems.

Embodiments as disclosed herein attempt to remedy at least some of these problems through systems and methods for the rules based distribution of managed content across heterogeneous storage distributed in the network environment. In particular, certain embodiments may employ entity rules in association with a content management system. An entity rule may be a rule specifying a set of parameters and a destination secondary storage location. When the entity rule is evaluated by the content system, a set of content managed by the content management system responsive to the rule may be identified or otherwise determined using the parameters of the rule.

Responsive content can be determined, for example, by searching the assets of the content management system based on the parameters. In fact, in one embodiment, the parameters of an entity rule may be specified as a search comprising a set of search parameters and operators. These parameters may include non-filesystem based parameters such as those based on the content of assets, campaigns or business units associated with assets, expiration dates, or almost any other non-filesystem based parameter that may be maintained by a content management system. These non-filesystem parameters may also include keywords, that may have been extracted from the content of assets or indexed. Such a search may be, for example, a search saved on the content management system and assigned a particular name as a shorthand reference. The responsive content can be determined by executing such a search on the content of the content management system. The search can, in turn, be executed by a search engine on the content management system using, for example, an index maintained by the search engine or content management (or other) metadata maintained by the content management system.

The content (e.g., determined as responsive to the search) may be moved from the primary storage location of the content management system to the secondary storage location specified by the entity rule. The management data (e.g., metadata) associated with moved content is updated with an identifier for the secondary storage location and an asset identifier that can be used to locate the content within the secondary storage location. An identifier for the secondary storage location may include an identifier for a content manager of the content management system that is configured to access an account associated with the content management system at the secondary storage location using an interface offered by that secondary storage location.

These entity rules may be executed once or be defined to recur at some interval (e.g., daily, weekly, monthly, etc.) or over some pre-defined period of time (for the next week, month, year, etc.) as is desired or specified by the rule itself. As may be understood, if an entity rule has been previously evaluated, certain assets within the set of content determined to be responsive to the rule using the parameters of the rule may have been previously moved to the secondary storage location associated with the entity rule (e.g., when the rule was previously evaluated). Accordingly, in one embodiment, the determined set of content may be refined by determining the current location of each asset of the determined set of content by accessing the metadata for the asset stored at the content management system. The asset may be removed from the set of content determined to be responsive to the entity rule if the asset currently resides at the secondary storage location specified by the entity rule.

Subsequently to the asset being placed under the management of the content management system, a user may desire to access the managed asset. The user's access to the asset may be facilitated by, for example, an interface allowing a user to directly access assets managed by the content management system or by a search interface allowing the user to search the assets management by the content management system. When a request to access a particular asset is received, the metadata associated with the asset may be accessed to determine the current location of the asset. If the asset is determined to currently reside in the primary storage of the content management system, the asset may be provided to the requesting user. For example, the user may be provided a link or other network location by which the user can access or download the requested asset from the primary storage location to the user's device.

If the asset is determined to currently reside in a secondary storage location or is in transit to the secondary storage, in one embodiment the asset may be restored to the primary storage using the content manager associated with the secondary storage location. When the asset is returned to the primary storage location, the asset may be provided to the requesting user. For example, the user may be provided a link or other network location by which the user can access or download the requested asset from the primary storage location to the user's device.

In one embodiment, if it is determined that the asset currently resides in a secondary storage location, or is in transit to the secondary storage, the asset may be provided from the secondary storage location to the user without restoring the asset to the primary storage location. In particular, the asset can be brought into memory at the content management system (e.g., a memory other than the primary storage location) and streamed or otherwise provided from the memory to the requesting user without restoring the asset to the primary storage location.

In certain embodiments, the provisioning of the asset to the user may be based on the size of the asset. If the size of the asset (e.g., as determined from metadata associated with the asset) is under a threshold size (e.g., which may be defined by an administrator of the content management system), the asset may be streamed from the secondary storage location to the content management system and then directly to the requesting user. If, however, the size of the asset is over (or equal) to the threshold size, or processing need to be performed on the asset (e.g., transformation, transcoding or other manipulations), the asset may be retrieved from the secondary storage and placed into a working storage at the content management system. If needed, any processing can then be performed on the asset in the working storage. The asset in working storage (e.g., as processed or originally retrieved) can then be streamed or otherwise provided to the requesting user without restoring the asset to the primary storage location.

If the asset is determined to currently reside in a secondary storage location (or is in transit to the secondary storage location), it can be determined if the secondary storage is currently available or offline. This status of the secondary storage location may, for example, be kept by the content manager associated with the secondary storage location. If the secondary storage location is unavailable (e.g., offline or inaccessible), the user may be presented with a message stating the requested asset is currently unavailable. Additionally, in certain embodiments, the user may be presented with a message that the user will be notified when the requested asset becomes available. When the requested asset is subsequently accessed at the secondary storage location or restored to the primary storage location, the user may be notified that the requested asset is available and provided with a link or network location where the asset can be accessed.

A message that the content is unavailable may also be provided to a user based on the secondary storage location at which the content resides. In certain embodiments, the secondary storage location may be of a type deemed too slow to facilitate real-time responses to a user (e.g., in a time frame the user expects for accessing content through a content management system). In such cases, the user may be presented with a message stating the requested asset is currently unavailable and that the user will be notified when the requested asset becomes available. When the requested asset is subsequently accessed at the secondary storage location and restored to the primary storage location, the user may be notified that the requested asset is available and provided with a link or network location where the asset can be accessed.

Alternatively, in some embodiments, instead of restoring the requested asset to the primary storage location, if the asset is determined to currently reside in the secondary storage, a direct link to the asset in the secondary storage may be provided to the requesting user. For example, the user may be provided a link or other network location by which the user can access or download the requested asset from the secondary storage location to the user's device. Such a link or location may, for example, be created based on the metadata stored in association with the asset at the content management system.

Embodiments as disclosed may thus provide a number of advantages. As one advantage, embodiments of the content management systems disclosed offer operators or users unparalleled flexibility and granularity with respect to the distribution of assets across storage locations by allowing these operators or users to define the distribution of managed assets across heterogeneous networked storage locations according to almost any criteria desired, including non-filesystem based parameters. In particular, almost any parameters or operators that may be used to search for content with respect to the content management system may be used to specify the entity rules by which content of the content management system may be distributed across these networked storage locations. Additionally, by using a content management framework including content managers corresponding to a particular secondary storage location, the generality of the content management system's operation may be retained while offering the ability to work with multiple heterogeneous types of secondary storage locations.

Accordingly, many of the advantages provided by embodiments include technical improvements to the functioning of computers and computer systems, including content management systems and servers. Such improvements may speed access to content (or reduce latency) by keeping certain assets in primary storage while moving other assets to secondary storage locations. The assets kept in primary storage locations can be assets associated with certain groups or business units that may tend to produce smaller or more current assets. By keeping assets associated with those groups and moving larger or less current assets to distributed storage locations, the access times to those retained assets may be reduced, not only because they are retained in primary storage, but additionally because there are fewer, and smaller, files retained in the primary storage. Thus, cost efficient, scalable storage can be taken advantage of while improving system performance and throughput.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 2 is a diagram of one embodiment of an interface for defining a content manager.

FIGS. 3A, 3B, and 3C are diagrams of embodiments of an interface for defining or editing an entity rule.

DETAILED DESCRIPTION

Figure 1:
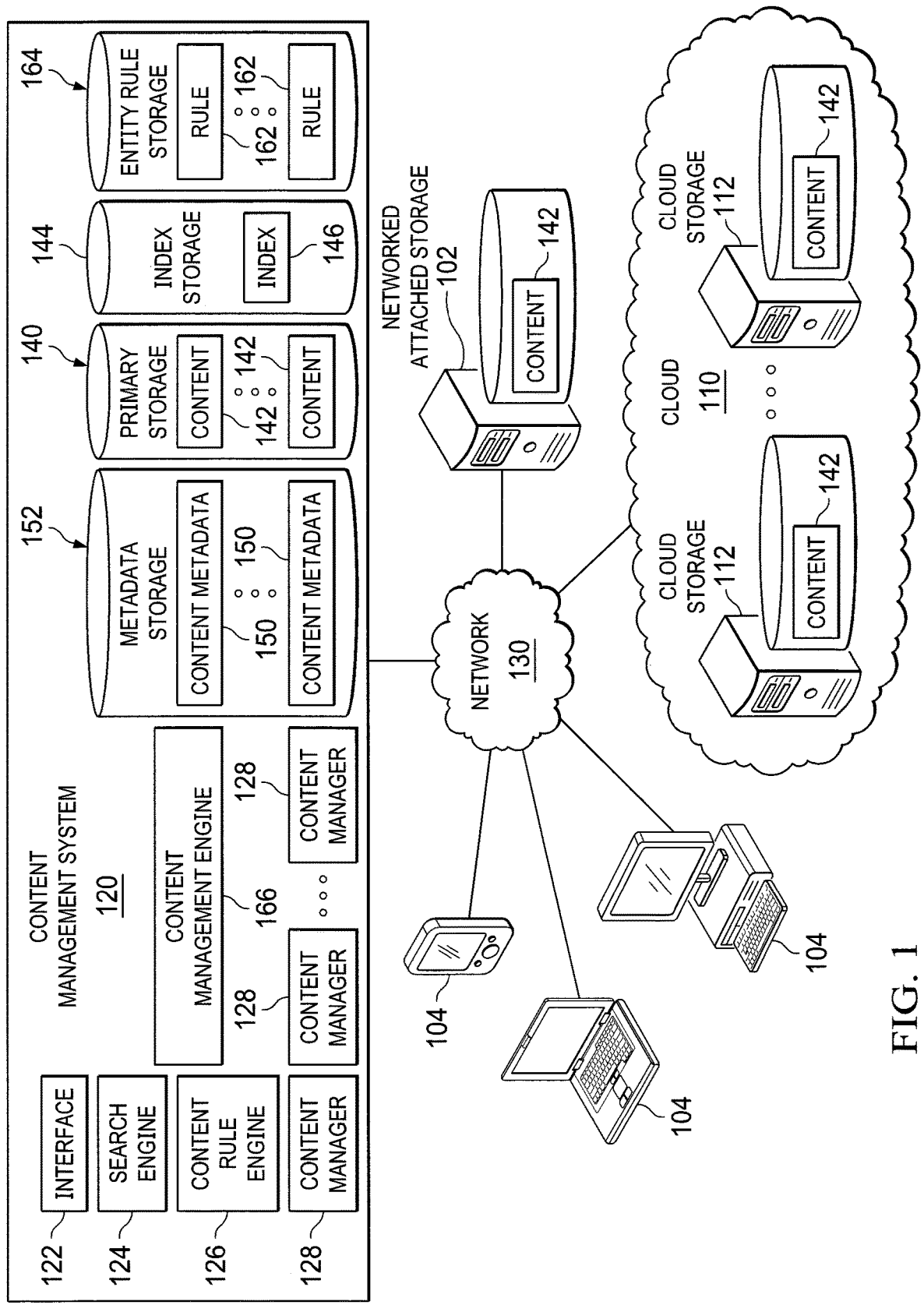
FIG. 1 is a block diagram depicting a distributed network environment including an embodiment of a content management system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As discussed above, users or providers of content management systems may desire to store assets using a variety of storage options, including those that may be faster, larger or less costly, distributed across a network environment, including cloud based storage options or the like. These desires are not readily satisfied, however, as the use of the storage options may present a high degree of additional complexity to the management of content in a network environment.

Embodiments as disclosed herein attempt to remedy at least some of these problems through systems and methods for the rules based distribution of managed content across heterogeneous storage distributed in the network environment. In particular, certain embodiments may employ entity rules in association with a content management system. An entity rule may be a rule specifying a set of parameters and a destination secondary storage location. When the entity rule is evaluated by the content system, a set of content managed by the content management system responsive to the rule may be identified or otherwise determined using the parameters of the rule.

Responsive content can be determined, for example, by searching the assets of the content management system based on the parameters. In fact, in one embodiment, the parameters of an entity rule may be specified as a search comprising a set of search parameters and operators. These parameters may include non-filesystem based parameters such as those based on the content of assets, campaigns or business units associated with assets, expiration dates, or almost any other non-filesystem based parameter that may be maintained by a content management system. These non-filesystem parameters may also include keywords, that may have been extracted from the content of assets or indexed. Such a search may be, for example, a search saved on the content management system and assigned a particular name as a shorthand reference. The responsive content can be determined by executing such a search on the content of the content management system. The search can, in turn, be executed by a search engine on the content management system using, for example, an index maintained by the search engine or content management (or other) metadata maintained by the content management system.

The content (e.g., determined as responsive to the search) may be moved from the primary storage location of the content management system to the secondary storage location specified by the entity rule. The management data (e.g., metadata) associated with moved content is updated with an identifier for the secondary storage location and an asset identifier that can be used to locate the content within the secondary storage location. An identifier for the secondary storage location may include an identifier for a content manager of the content management system that is configured to access an account associated with the content management system at the secondary storage location using an interface offered by that secondary storage location.

Referring now to FIG. 1, a distributed network environment including an embodiment of a content management system for the rules based distribution of managed content across heterogeneous storage distributed in the network environment. The distributed network environment includes a content management system 120 communicating over a computer network 130 with various user computing device 104 and distributed storage locations. Content management system 120 may be, for example, a media manager or digital asset manager such as OpenText's Media Manager (OTMM) or Digital Asset Manager (DAM). The network may include the Internet, an internet, an intranet, a Local Area Network (LAN), a Wide Area Network (WAN), a cellular network, a wireline or wireless network, some other type of computer network or some combination of networks. The distributed storage locations may include, for example, a networked attached storage (NAS) 102 or one or more cloud based storage locations 112 distributed in a cloud environment 110.

A cloud based storage location 112 may be data storage in which the physical storage on which the data is stored may span multiple servers (and often physical locations), and the physical environment is typically owned and managed by a cloud storage provider. These cloud storage providers are responsible for keeping the data available and accessible, and the physical environment protected and running. Users can obtain accounts from the cloud based storage providers to utilize storage capacity at the cloud based storage location 112 to store user, organization, or application data. Cloud storage locations 112 may be accessed through a co-located cloud computer service, a web service application programming interface (API), by applications that utilize the API or by some other manner. Examples of such cloud based storage locations 112 include Amazon Web Services (AWS) Simple Storage Services, Storage Gateway or Glacier, Google's Cloud Storage, Microsoft Windows Azure Storage, IBM's SmartCloud Enterprise-Object Storage, etc.

Content management system 120 may employ a content management framework comprises of one or more content managers 128. Each content manager 128 may be an instance of a particular class or type of connector or content manager having appropriate methods or procedures for accessing one particular type, or a set of types, of NAS 102 or cloud storage locations 112. For example, a content manager 128 may be configured to access an AWS Simple Storage Services (S3), Microsoft Windows Azure Blob Storage, the Google Cloud, etc. Each instance of a content manager 128 may be configured to access a particular cloud storage location 112 or NAS 102 by providing the instance of the content manager 128 with the credentials (e.g., account name, password, keys, etc.) needed to access an account at the cloud storage location 112 associated with the content management system 120 (e.g., obtained by the operators or owners of the content management system 120).

The content managers 128 may offer a similar set of interfaces (e.g., put, read, delete) such that the details of the underlying communications with the cloud storage provider 112 or NAS 102 are abstracted from a user of the content managers 128 and each content manager 128 may be accessed in a substantially similar manner. FIG. 2 depicts one embodiment of an interface depicting the configuration of content managers in a content management system. Embodiment of these content managers 128 will also be better understood with reference to the attached Appendix which describes one embodiment of classes and interfaces that may be implemented by, or used to implement, content managers.

Users at user devices 104 may access the content management system 120 through an interface 122 provided by the content management system 120. This interface 122 may be, for example, a web based interface accessible through a browser at a user's device 104 such as an HTML (e.g., HTML5 interface). The interface 122 may also include an API, Representational State Transfer (REST) or another type of web services or other interface. The user may thus use the interface 122 to provide assets to the content management system 120 such that the assets 142 can be managed or to access these assets 142 at a later point. Assets 142 may also be provided for management by the content management system 120 in a wide variety of other manners, as will be apparent.

When an asset 142 is provided to the content management system 120, it may be initially stored at the primary storage location 140 of the content management system 120. The provided asset 142 may also be indexed as is known in the art, such that an index 146 of assets 142 may be maintained in an index storage 144 such as a Solr search platform. The index 146 may, for example, be an index of keywords extracted, or determined, from the content of the assets 142. Content management system 120 may therefore include a search engine 124 (which may be a Solr based search engine) through which content 142 managed by the content management system 120 may be searched based on index 146. The search engine 124 may offer an interface accessible by users at their user device 104 (e.g., through a web based interface that may be incorporated with interface 122) or that may be accessed through a web services interface such as a REST interface, or an API.

Content management server 120 may manage assets 142 stored in primary data storage 140 and secondary data storage locations 102, 112 using content management engine 166. While in some embodiments, the primary data storage location 140 may be local, on premise or near-line storage, in other embodiments the primary storage location 140 may also be NAS 102, cloud based storage 112 or another type of storage location accessible over network 130 of a desired speed. In one embodiment, each asset 142 is associated with content management metadata 150. The content metadata 150 may include an object identifier associated with the asset such as a globally or universally unique identifier (GUID) to identify objects, the size of a file, a timestamp indicating a last save time, an identifier for the storage location 102, 112, 140 where the asset 142 currently resides or an asset identifier that can be used to locate the asset 142 within the storage location 102, 112, 140 where the asset 142 currently resides. An identifier for the storage location 102, 112, 140 may include an identifier for a content manager 128 of the content management system 120 that is configured to access the storage location 102, 112, 140. An asset identifier may include a Universal Resource Locator (URL), object ID, or path where the asset 142 is located at the storage location 102, 112, 140 where the asset 142 currently resides.

Content rule engine 126 may distribute assets 142 managed by the content management system 120 across the storage locations 102, 112, 140 distributed in the computer network environment based on entity rules 162 of the content management system 120. In particular, in one embodiment, users may access interface 122 to define entity rules 162. An entity rule 162 may be a rule specifying a set of parameters and a destination secondary storage location such as a cloud based storage location 112 or NAS 102. The entity rule 162 may also include a time period for evaluation. This time period may include a start or end date or time or a recurrence interval (e.g., once, hourly, weekly).

In one embodiment, the parameters of an entity rule 162 may be specified as a search comprising a set of search parameters and operators. These search parameters may include, for example, values determined in association with the asset 142 as indexed in index 146 or metadata 150 in metadata storage 152. Specifically, the entity rule 162 may include non-filesystem parameters that may be associated with the contents of assets or the content management of assets such as those based on the content of assets, campaigns or business units associated with assets, expiration dates, content management, business or workflow metadata, or almost any other non-filesystem based parameter that may be maintained by a content management system. These non-filesystem parameters may also include keywords, that may have been extracted from the content of assets or indexed in index 146.

Figure 3A:
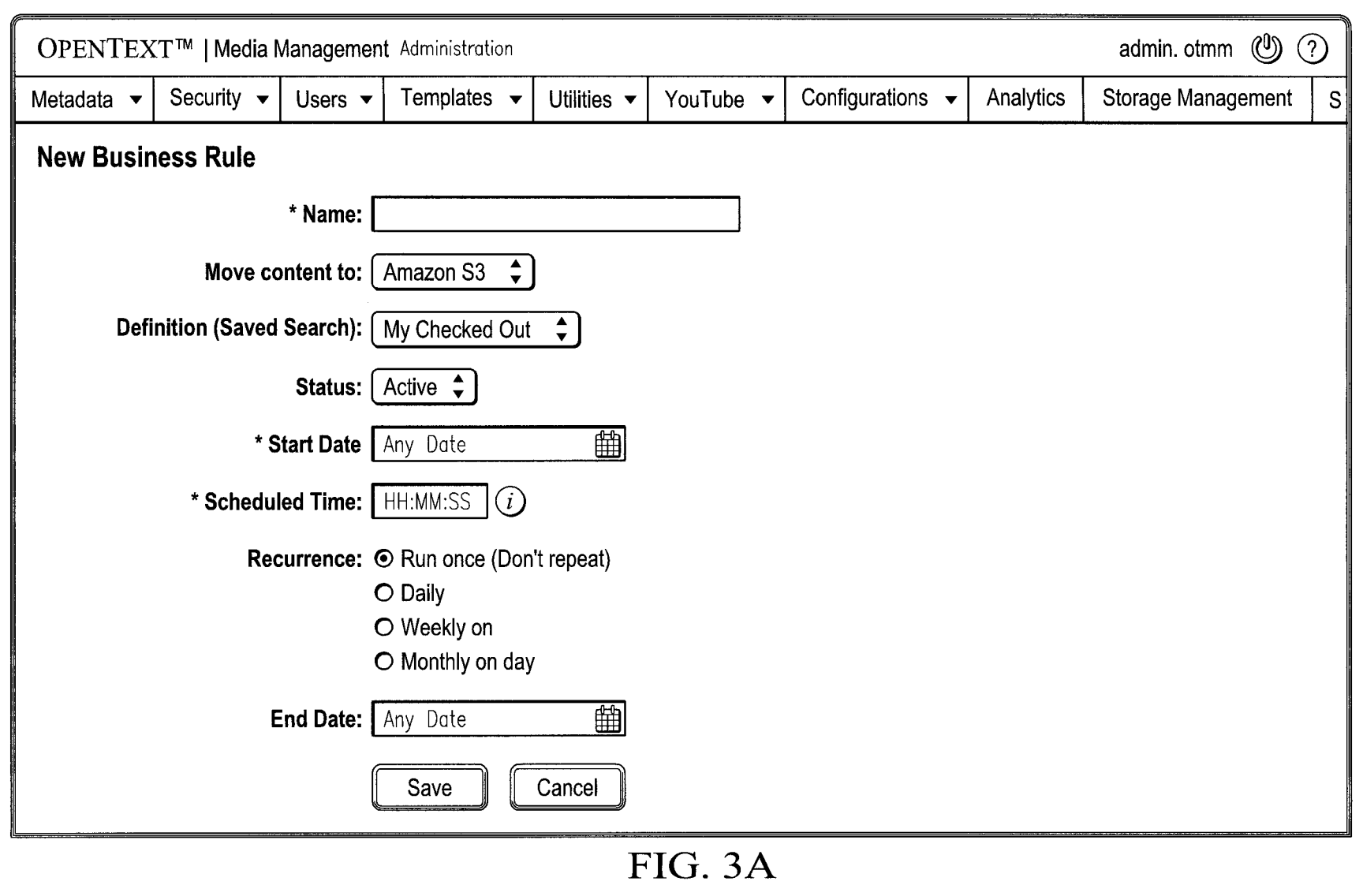
Figure 3B:
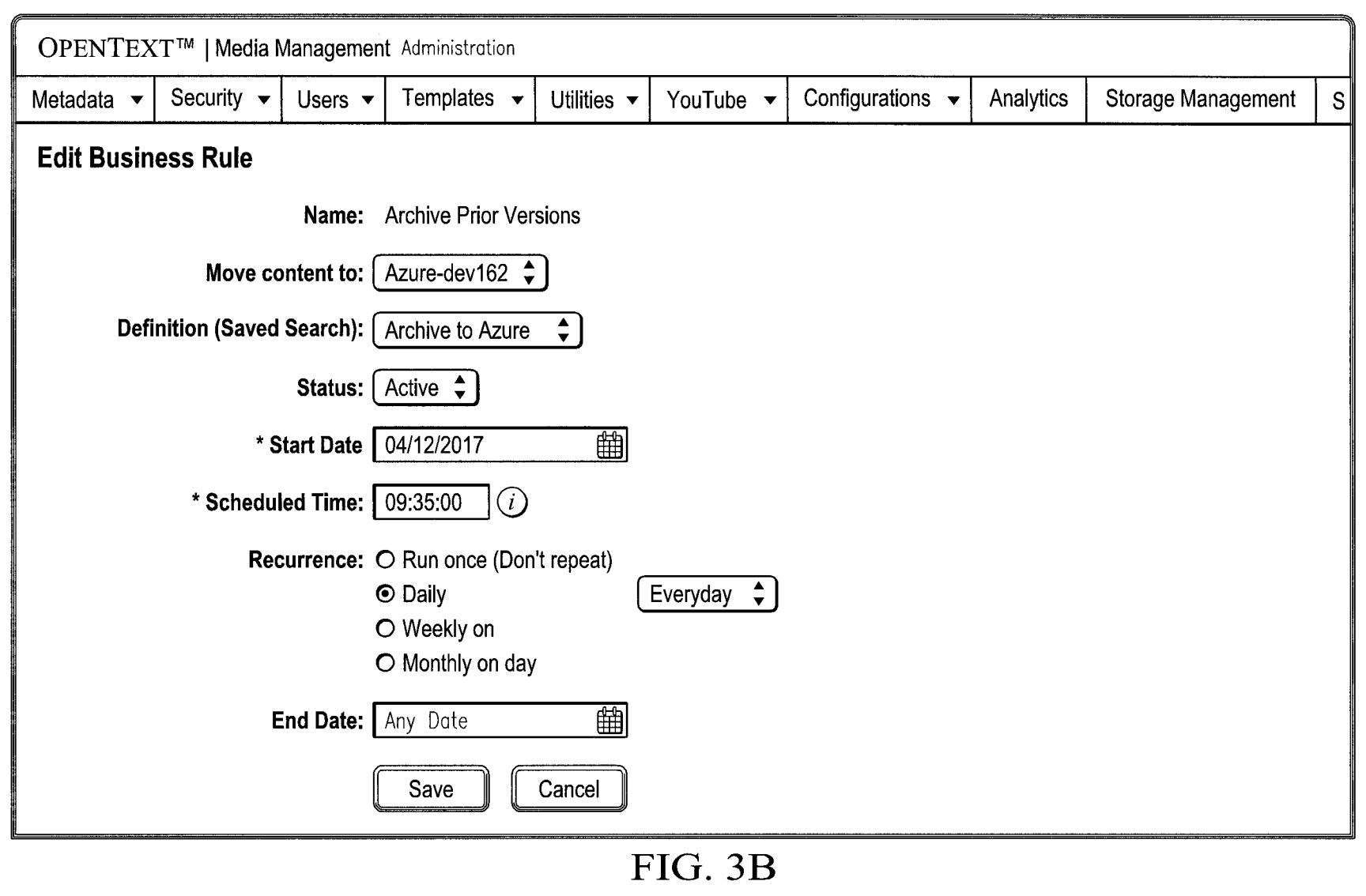
Figure 3C:
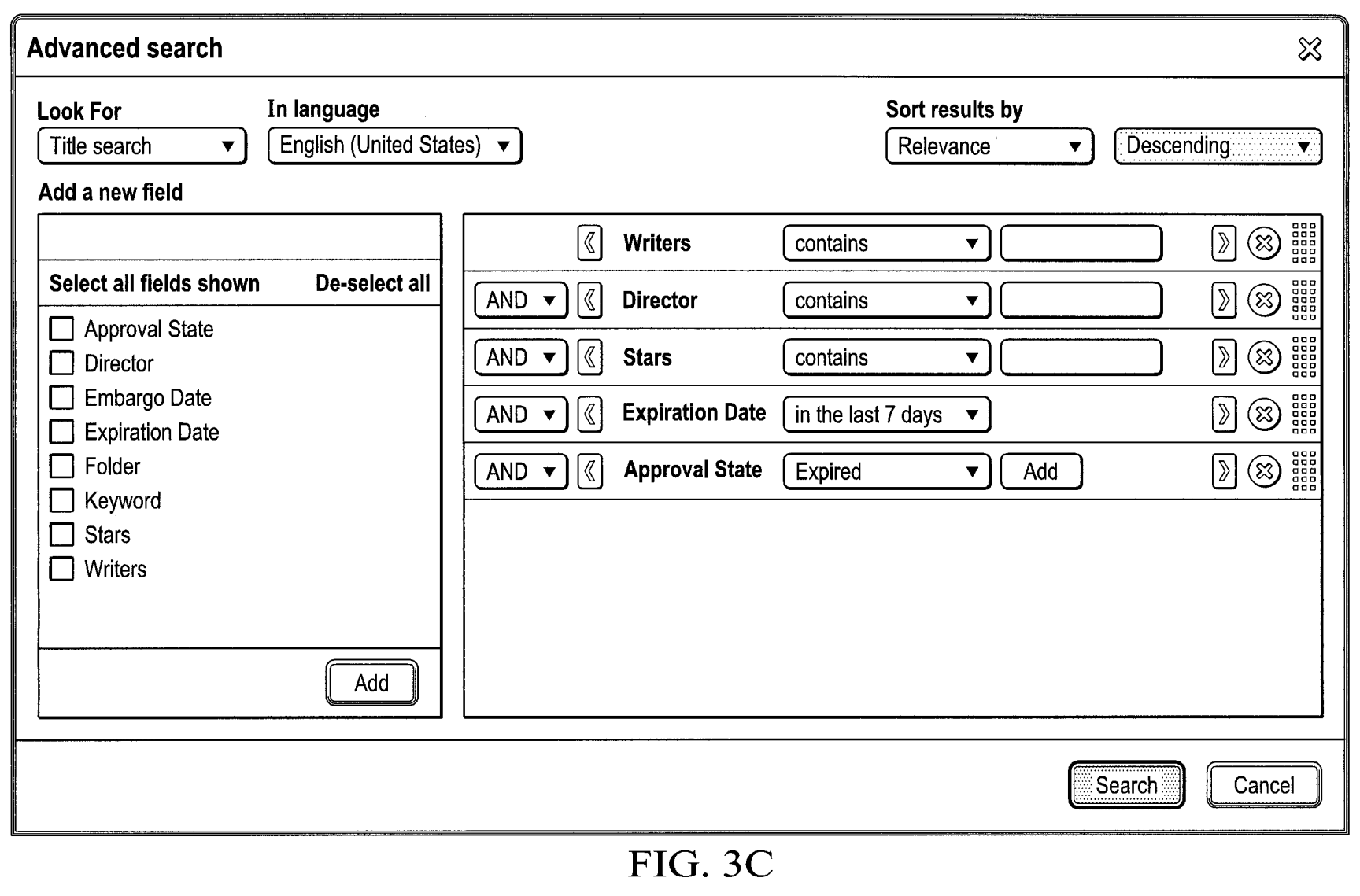

In this manner, the entity rules 162 may serve to identify assets that have similar or related content, are associated with the same groups, business, campaigns, etc. or almost any other criteria desired. Such granularity is possible at least because the entity rules 162 allow the specification or arbitrarily complex searches that include parameters that can be associated with the contents of the asset, the management of the asset, the use of assets or other data that exists or is determined at a higher level than the filesystem storing the assets. Such a search may be, for example, a search saved on the content management system 120 and assigned a particular name as a shorthand reference. The responsive content can be determined by executing such a search on the content of the content management system. FIGS. 3A, 3B and 3C depict embodiments of an interface for defining or editing an entity rule 162. When an entity rule 162 is defined and saved, it is stored in entity rule store 164 of the content management system 120. In particular, the entity rule 162 may include or reference one or more saved searches. These saved searches may be defined using content management metadata, including business or workflow metadata, as shown in FIG. 3C.

Content rule engine 126 may evaluate the entity rules 162 stored in the entity rule storage 164 to distribute the managed assets 142 of the content management system 120 to the various secondary storage locations such as cloud based storage 112 or NAS 102. In particular, the content rule engine 126 may access an entity rule 162 and determine if the entity rule 162 should be further evaluated based on a start or end date or time interval of the entity rule 162. In one embodiment, the entity rule 162 may have a time stamp associated with it indicating when the entity rule 162 was created or last evaluated. Thus, this determination can be based on the time stamp and the start or end date or time interval associated with the entity rule 162 and the associated time stamp of the entity rule. The content rule engine 126 can update this time stamp when the entity rule 162 is evaluated.

If it is determined that the entity rule 162 should not be further evaluated, the content rule engine 126 may select another entity rule 162 for evaluation. If, however, the content rule engine 126 determines the entity rule 162 should be further evaluated, the content rule engine 126 may obtain the parameters of the entity rule 162 and determine a set of content 142 managed by the content management system 120 responsive to the rule. Responsive content can be determined, for example, by searching the assets 142 of the content management system based on the parameters. The content rule engine 126 may, for example, submit the parameters of the entity rule 162 as a search to search engine 124 and receive a set of identifiers for responsive content 142 back from the search engine 124 based on a search performed by the search engine 124. In one embodiment, such a search may be, for example, a search saved on the content management system 120 and assigned a particular name as a shorthand reference. The content rule engine 126 can specify the saved search to the search engine 124 and receive a set of identifiers for responsive content 142 back from the search engine 124 based on the saved search being performed by the search engine 124.

As the entity rule 162 may be executed once or be defined to recur at some interval, or over some pre-defined period of time, if an entity rule 162 has been previously evaluated, certain assets within the set of content determined to be responsive to the rule using the parameters of the rule may have been previously moved to the specified secondary storage location 102, 112. Accordingly, in one embodiment, the determined set of content 142 may be refined by the content rule engine 126 by determining the current location of each asset 142 of the determined set of content by accessing the metadata 150 for the asset 142. An asset 142 may be removed from the set of content 142 determined to be responsive to the entity rule 162 if the asset 142 currently resides at the secondary storage location 102, 112 specified by the entity rule 162.

The content rule engine 126 can then move the determined responsive content 142 from their current storage location to the secondary storage location 102, 112 specified by the entity rule 162. In particular, for each identified asset 142, the content rule engine 126 accesses the metadata 150 associated with that asset 142 to determine the current storage location 102, 112, 140 and identifier of the asset 142 associated with that storage location. In one embodiment, the current storage location 102, 112, 140 may be an identifier of a content manager 128 associated with the storage location 102, 112, 140 where the asset 142 currently resides.

To move the content to the secondary storage location 102, 112, the content rule engine 126 may provide the asset 142 or the current identifier thereof (e.g., with respect to the primary storage location 140 or other storage location 102, 112 where the asset 142 currently resides) to the content manager 128 associated with the secondary storage location 102, 112 specified as the destination by the entity rule 162. The content rule engine 126 can update the status of the asset 142 in the metadata 150 associated with asset 142 to reflect it is currently in transit (e.g., a status of "unavailable" or "in transit"). When the content manager 128 stores the content at the secondary storage location 102, 112, the content manager 128 may return an identifier for the moved asset 142 with respect to the secondary storage location 102, 112. This identifier may be a path or object identifier that can be used to locate the content at the secondary storage location 102, 112. The content rule engine 126 can then update the metadata 150 of the asset 142 with the identifier of the secondary storage location 102, 112 where the asset 142 resides (e.g., the secondary storage location specified by the entity rule 162) and the identifier of the location of the asset 142 with respect to that secondary storage location 102, 112 (e.g., the object identifier, URL, path, etc.). Again, the identifier of the secondary storage location 102, 112 may be an identifier of the content manager 128 for accessing that secondary storage location 102, 112. The content rule engine 126 can also update the metadata 150 of the asset 142 with a status indicating the asset 142 is available ("available"). Alternatively, the status may indicate the asset 142 is unavailable (e.g., "unavailable"), to indicate the asset is not in the primary data storage 140.

During operation of the content management system 120, a user may access an asset 142 using interface 122 or through search engine 124. The user's access to the asset 142 may be facilitated by, for example, using the interface 122 to allow a user to directly access assets 142 managed by the content management system 120 or by a search interface 124 allowing the user to search the assets 142 managed by the content management system 120. When a request to access a particular asset 142 is received, the content management engine 166 may access the metadata 150 associated with the asset 142 determine the current location of the asset 142. If the asset 142 is determined to currently reside in the primary storage 140 of the content management system 120, the asset 142 may be provided to the requesting user through the interface 122. For example, the user may be provided a link or other network location by which the user can access or download the requested asset 142 from the primary storage location 140 to the user's device 104.

If the asset 142 is determined to currently reside in a secondary storage location 102, 112, or is in transit to the secondary storage, in one embodiment the asset 142 may be restored to the primary storage 140. In particular, the content management engine 166 may provide the asset identifier for the asset 142 to the content manager 128 associated with the secondary storage location 102, 112 where the asset 142 currently resides. When the asset 142 is returned to content management engine 166, the content management engine 166 may place the asset 142 in the primary storage location 140 and update the metadata 150 associated with the asset 142 to reflect that the asset 142 is located in the primary storage location 140. The content management engine 166 can then provide the asset 142 to the requesting user through the interface 122. For example, the user may be provided a link or other network location by which the user can access or download the requested asset from the primary storage location 140 to the user's device 104.

In certain embodiments, if it is determined that the asset currently resides in a secondary storage location 102, 112, or is in transit to the secondary storage, the asset 142 may be provided from the secondary storage location 102, 112 to the user without restoring the asset to the primary storage 140. In particular, the content management engine 166 may provide the asset identifier for the asset 142 to the content manager 128 associated with the secondary storage location 102, 112 where the asset 142 currently resides. When the asset 142 is returned to content management engine 166, the content management engine 166 can then provide the asset 142 to the requesting user through the interface 122 without restoring the asset to the primary storage location 140. For example, the asset can be streamed or otherwise provided from the content management engine 166 to the requesting user.

In certain embodiments, the provisioning of the asset 142 to the user may be based on the size of the asset 142. If the size of the asset 142 (e.g., as determined from metadata 150 associated with the asset 142) is under a threshold size (e.g., which may be defined by an administrator of the content management system), the content management engine 166 may provide the asset identifier for the asset 142 to the content manager 128 associated with the secondary storage location 102, 112 where the asset 142 currently resides. When the asset 142 is returned to content management engine 166, the content management engine 166 can then provide the asset 142 to the requesting user through the interface 122 without restoring the asset to the primary storage location 140. If, however, the size of the asset 142 is over (or equal) to the threshold size, or processing need to be performed on the asset (e.g., transformation, transcoding or other manipulations), the asset 142 may be retrieved from the secondary storage 102, 112 by content management engine 166 (e.g., using a content manager 128) and placed into a working storage at the content management system 120. If needed, any processing can then be performed on the asset in the working storage. The content management engine 166 can then provide the asset 142 in working storage (e.g., as processed or originally retrieved) to the requesting user through the interface 122 without restoring the asset to the primary storage location 140.

In one embodiment, if the asset 142 is determined to currently reside in a secondary storage location 102, 112 (or is in transit to the secondary storage location), it can be determined if the secondary storage 102, 112 is currently available or offline. This status of the secondary storage location 102, 112 may, for example, be kept by the content manager 128 associated with the secondary storage location 102, 112. If the secondary storage location 102, 112 is unavailable (e.g., offline or inaccessible), the user may be presented with a message stating the requested asset is currently unavailable and that the user will be notified when the requested asset 142 becomes available. When the requested asset 142 is subsequently accessed at the secondary storage location 102, 112 (or restored to the primary storage location 140), the user may be notified that the requested asset 142 is available and provided with a link or network location where the asset can be accessed.

A message that the content is unavailable may also be provided to a user based on the secondary storage location 102, 112 at which the content resides. In certain embodiments, the secondary storage location 102, 112 may be of a type deemed too slow to facilitate real-time responses to a user (e.g., in a time frame the user expects for accessing content through a content management system 120 from a user device 104). In such cases, the user may be presented with a message stating the requested asset 142 is currently unavailable and that the user will be notified when the requested asset 142 becomes available. When the requested asset is subsequently accessed at the secondary storage location 102, 112 and restored to the primary storage location 140, the user may be notified that the requested asset 142 is available and provided with a link or network location where the asset can be accessed.

Alternatively, in some embodiments, instead of restoring the requested asset 142 to the primary storage location 102, 112, if the asset 142 is determined to currently reside in the secondary storage, a direct link to the asset 142 in the secondary storage 102, 112 may be provided to the requesting user. For example, the user may be provided a link or other network location by which the user can access or download the requested asset 142 from the secondary storage location 102, 112 to the user's device. Such a link or location may, for example, be created based on the metadata 150 stored in association with the asset 142 at the content management system 120.

Figure 4:
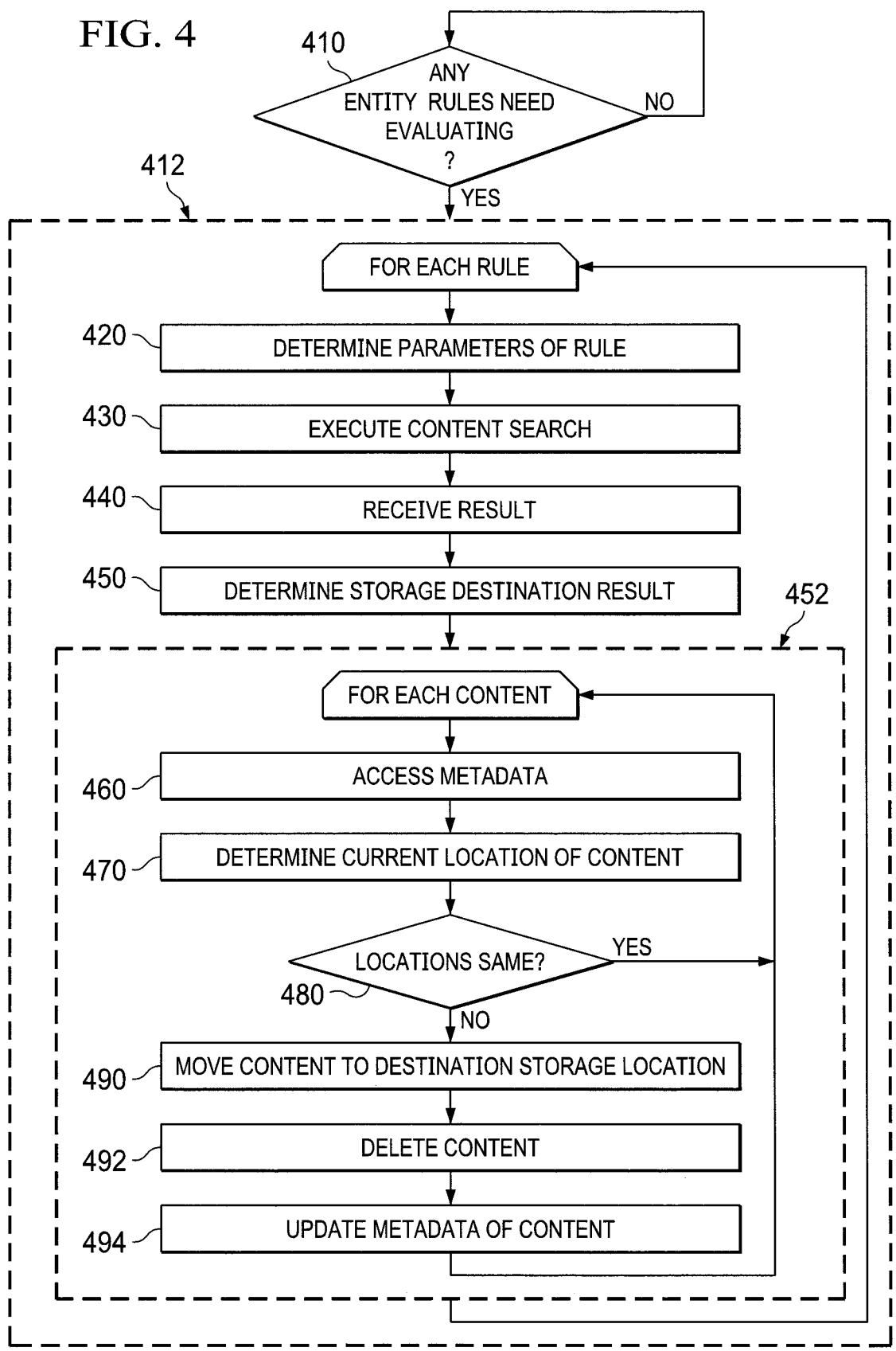
FIG. 4 is a flow diagram for one embodiment of a method for rules based distribution of managed assets to distributed networked storage locations.

Moving now to FIG. 4, a flow diagram for one embodiment of a method for rules based distribution of managed assets to distributed networked storage locations is depicted. Embodiments of such a method may be, for example, utilized by embodiments of content management system 120 as discussed above. Initially, it can be determined if any entity rules of a content management system need evaluating (STEP 410). This determination may be made by evaluating each of the entity rules to determine any entity rules that should be further evaluated based on a start or end date or time interval of each of the entity rules. For example, each entity rule may have a time stamp associated with it indicating when the entity rule was created or last evaluated. Thus, this determination can be based on the time stamp and the start or end date or time interval associated with the entity rule and the associated time stamp of the entity rule.

For each of the entity rules which is determined should be further evaluated (LOOP 412), the parameters of the entity rule can be determined (STEP 420). The entity rule may specify a set of parameters and a destination secondary storage location where the parameters of an entity rule may be specified as a search comprising a set of search parameters and operators. Using the parameters of the entity rule, a content search may be executed (STEP 430). This content search may be executed by performing a search on the content of the content management system based on the parameters. For example, the parameters (e.g., and operators) of the entity rule may be submitted as a search to search engine a set of identifiers for responsive content managed by the content management system received back in return to the search (STEP 440). The secondary storage location specified by the entity rule can also be determined (STEP 450).

For each asset of the responsive set of content (LOOP 452), metadata associated with the asset may be determined (STEP 460) and the current location of the asset determined from the metadata of the asset (STEP 470). If the entity rule has been previously evaluated certain assets responsive to the rule using the parameters of the rule may have been previously moved to the secondary storage location specified by the entity rule. Accordingly, in one embodiment, it can be determined if the current location of the asset is the same as the secondary storage location specified by the entity rule (STEP 480). If the current location of the asset as specified by the metadata is the same as the destination secondary storage location specified by the entity rule, evaluation of that asset may stop and the next asset of the responsive set of content may be evaluated (Y branch of STEP 480).

If the current location of the asset is not the same as the secondary storage location specified by the entity rule (N branch of STEP 480) the asset may be moved to the destination secondary storage location specified by the entity rule (STEP 490). In particular, the metadata associated with that asset can be accessed to determine the current storage location and identifier of the asset associated with that storage location. In one embodiment, the current storage location may be an identifier of a content manager associated with the storage location where the asset currently resides. To move the content to the destination secondary storage location, the asset or the current identifier thereof (e.g., with respect to the storage location where the asset currently resides) may be provided to the content manager associated with the secondary storage location specified as the destination by the entity rule. The content manager for the secondary storage location can then transfer the asset from the current storage location to the destination storage location associated with that content manager.

The asset can then be deleted from the original storage location (STEP 492) and the metadata associated with the asset updated to reflect the asset's current location at the destination secondary storage location (STEP 494). In particular, when the content manager stores the asset at the destination secondary storage location, the content manager may return an identifier for the moved asset with respect to the secondary storage location. This identifier may be a path or object identifier that can be used to locate the content at the secondary storage location. The metadata of the asset can be updated with the identifier of the secondary storage location where the asset resides (e.g., the secondary storage location specified by the entity rule) and the identifier of the location of the asset with respect to that secondary storage location (e.g., the object identifier, URL, path, etc.). The identifier of the secondary storage location may, for example, be an identifier of the content manager for accessing that secondary storage location. The content rule engine can also update the metadata of the asset with a status indicating the asset is available ("available"). Alternatively, the status may indicate the asset is unavailable (e.g., "unavailable"), to indicate the asset is not in a primary data storage location.

Figure 5:
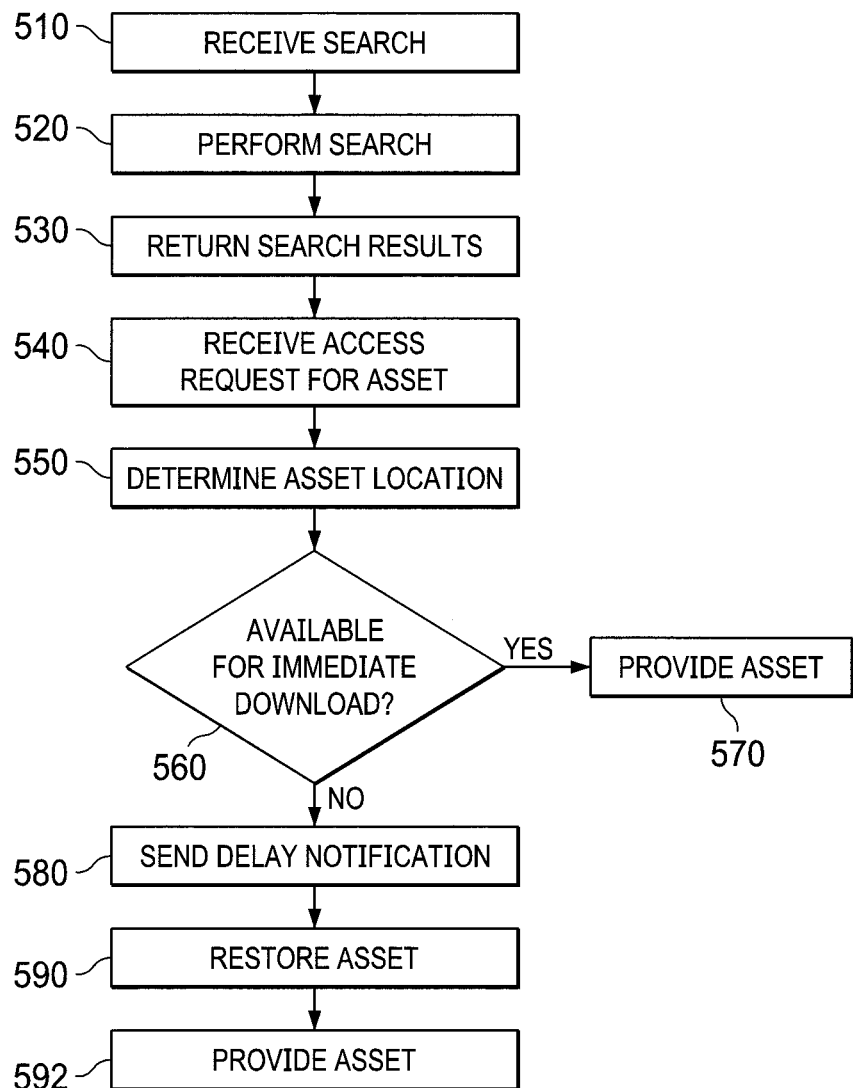
FIG. 5 is a flow diagram for one embodiment of a method for accessing managed assets distributed across networked storage locations.

Looking now at FIG. 5, a flow diagram for one embodiment of a method for accessing managed assets distributed across networked storage locations is depicted. Embodiments of such a method may be, for example, utilized by embodiments of content management system 120 as discussed above. During operation of the content management system, a user may access an asset using an interface or through a search engine. In one embodiment, the content management system may receive a search (STEP 510) through a search interface allowing the user to search the assets managed by the content management system. The search can be performed, for example, using the index of the assets management by the content management system (STEP 520) and the search results returned to the user (STEP 530).

The user can then make a request to the content management system to access a particular asset (STEP 540). When the request to access the particular asset is received, the content management engine may access the metadata associated with the asset to determine the current location of the asset (STEP 550). It can then be determined if the asset is available for immediate download (STEP 560). This determination can be made based on the metadata associated with the requested asset. In particular, the determination may be made based on the current location of the requested asset and a status of the current location of the requested asset.

If the asset is determined to currently reside in the primary storage of the content management system, the asset may be determined to be available for immediate download and may be provided to the requesting user through the interface (STEP 570). For example, the user may be provided a link or other network location by which the user can access or download the requested asset from the primary storage location to the user's device.

If the asset is determined to currently reside in a secondary storage location, or is in transit to the secondary storage, the asset may be determined to be currently unavailable. In one embodiment, if the asset is determined to currently reside in a secondary storage location (or is in transit to the secondary storage location) to determine if the asset is available for immediate download (STEP 560) it can be determined if the secondary storage is currently available or offline. This status of the secondary storage location may, for example, be kept by the content manager associated with the secondary storage location.

In the asset is deemed to be currently unavailable, a delay notification may be sent to the user (STEP 580). After the delay notification, the requested asset may be restored to the primary storage of the content management system (STEP 590). In particular, the content management engine may provide the asset identifier for the asset to the content manager associated with the secondary storage location where the asset currently resides. When the asset is returned, it is placed in the primary storage location and the metadata associated with the asset is updated to reflect that the asset is located in the primary storage location. The content management engine can then provide the asset to the requesting user through the interface (STEP 592). Specifically, in one embodiment, the user may be notified that the requested asset is available and provided with a link or network location where the asset can be accessed.

Figure 6A:
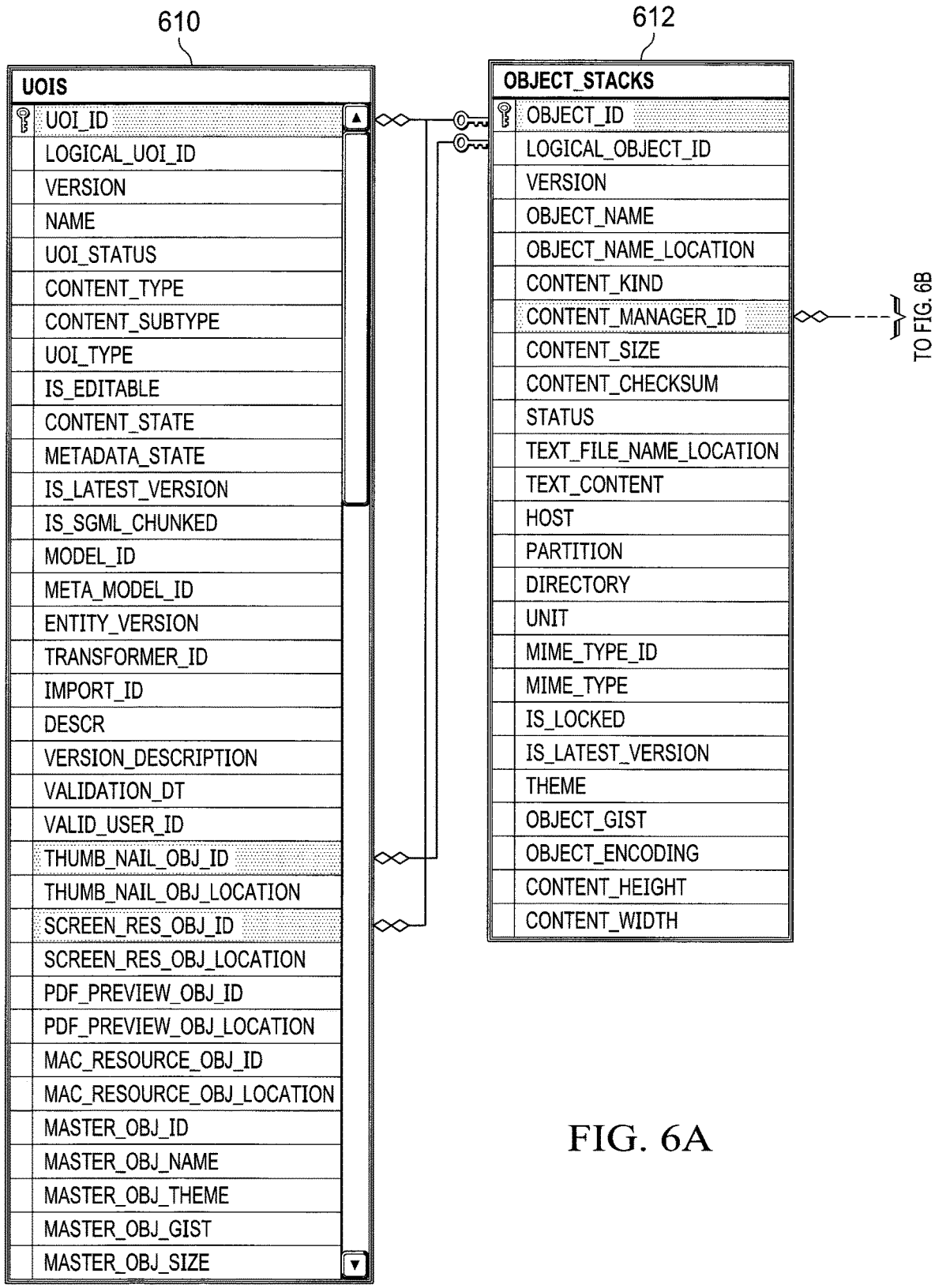
FIGS. 6A and 6B are block diagrams depicting the schema and contents of embodiments of tables that may be used to support distribution of assets across networked storage locations.
Figure 6B:
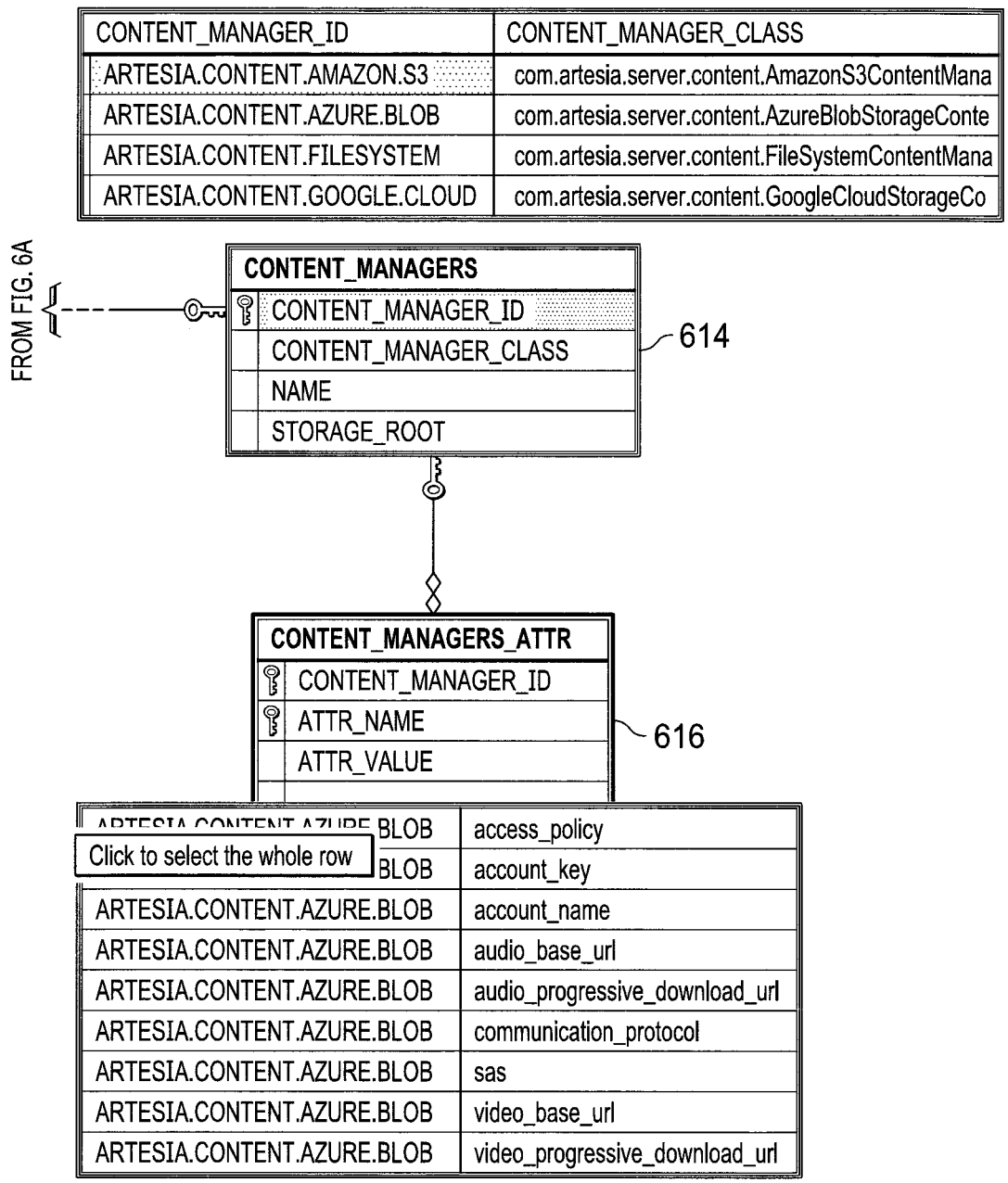

FIGS. 6A and 6B are block diagrams depicting the schema of embodiments of tables that may be used to support distribution of assets across storage locations. As can be seen, there is a U_O_I_S_(UOIS) table 610. This table may be used to store or represent an asset. This UOIS table may have three columns that point to three rows in the OBJECT_STACKS table 612. The OBJECT_STACKS table 612 has the directions to retrieve the asset by using a combination of STORAGE_ROOT in the CONTENT_MANAGERS table and the OBJECT_NAME_LOCATION from the OBJECT_STACKS table 612. The OBJECT_STACKS table 612 may also have the fields, OBJECT_ID which is a primary mapped back to the UOIS table 610, OBJECT_NAME which is a short name of the asset, OBJECT_NAME_LOCATION is the content manager specific information on where the file for the asset is actually stored and the CONTENT_MANAGER_ID which is the key to the CONTENT_MANAGERS table 614 which includes the Content Managers that are currently valid or active for the system.

In particular, content managers are registered in the CONTENT_MANAGERS table 614, with the CONTENT_MANAGER_ID filed being a unique identifier for a registered content manager; the CONTENT_MANAGER_CLASS field being a class name for the implementation of the content manager interfaces; the NAME field being a short descriptive name; and the STORAGE_ROOT being a value identified a root location for content storage for the storage location associated with that content manager.

In addition to the CONTENT_MANAGERS table 614 there is the CONTENT_MANAGERS_ATTR table 616. This table may be used to store additional configuration information. The information is stored as key\value pairs which are provided to the content manager class during initialization. This table may be utilized to associate information with a content manager implementation. For example, suppose the implementation makes use of a third party storage facility residing on a separate computer. The IP address of this computer can be stored in the CONTENT_MANAGERS_ATTR table. For example, this could be stored as "main_ip_address" for ATTR_NAME and 202.165.701.141 for ATTR_VALUE.

The content manager that is chosen to store an asset is determined upon import. If no content manager is defined during import, a default content manager identifier is looked up from the Media Management configuration (e.g., in an administrator setting). Specifically, the configuration attribute may be IMPORT\SERVER\DEFAULT_ CONTENT_MANAGER_ID. In one embodiment, the content manager identifier may be explicitly set during import of an asset. A user may specify which content manager to use during import on a job or asset. To set the content manager to use for an asset, a content manager identifier of an ImportJob object may be set. Similarly, to set the content manager on a per asset basis, the content manager identifier of a ContentDataRequest may be set in the ImportAsset object.

Figure 7A:
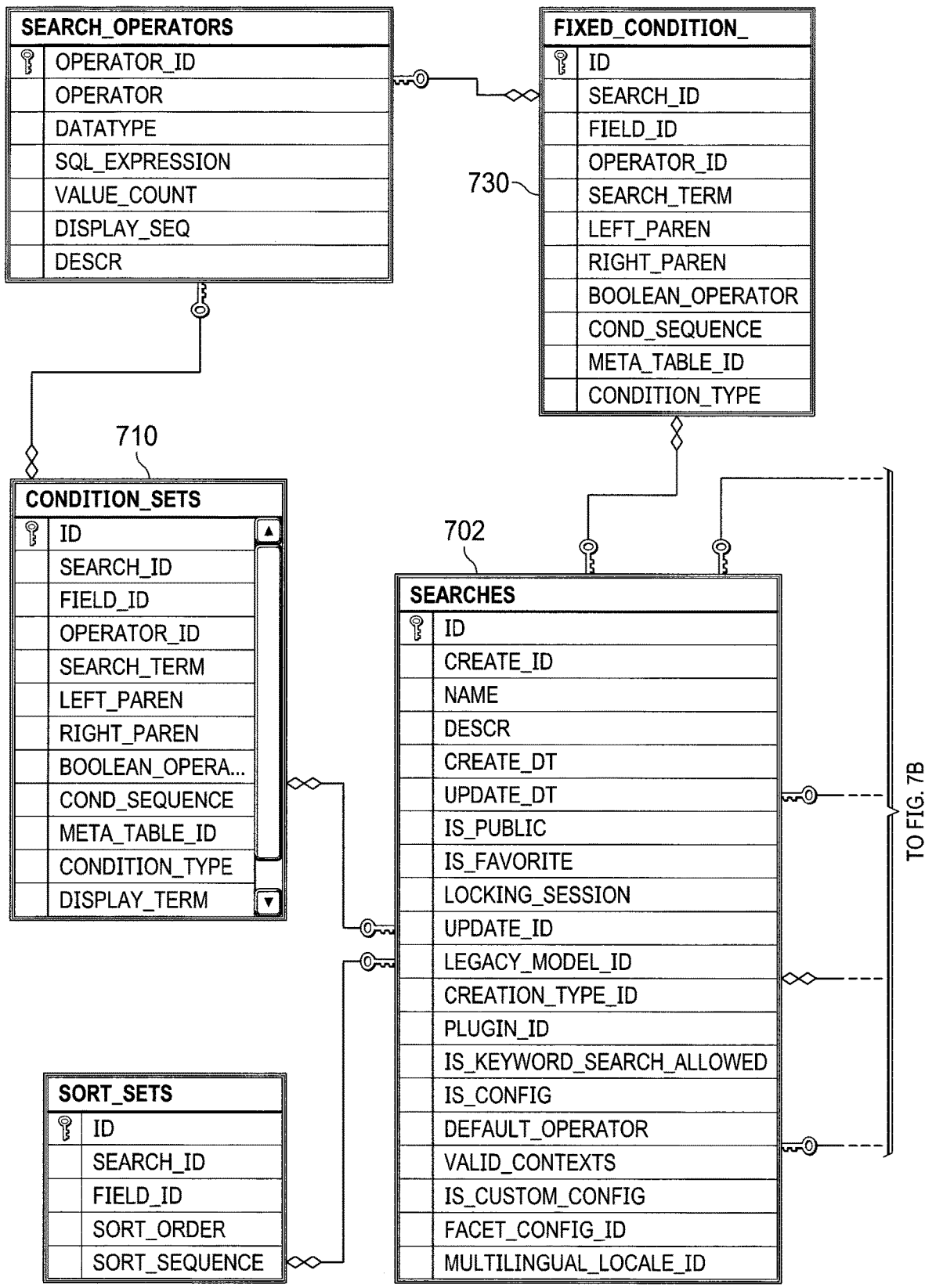
FIGS. 7A and 7B are block diagrams depicting the schema and contents of embodiments of tables that may be used to support entity rules.
Figure 7B:
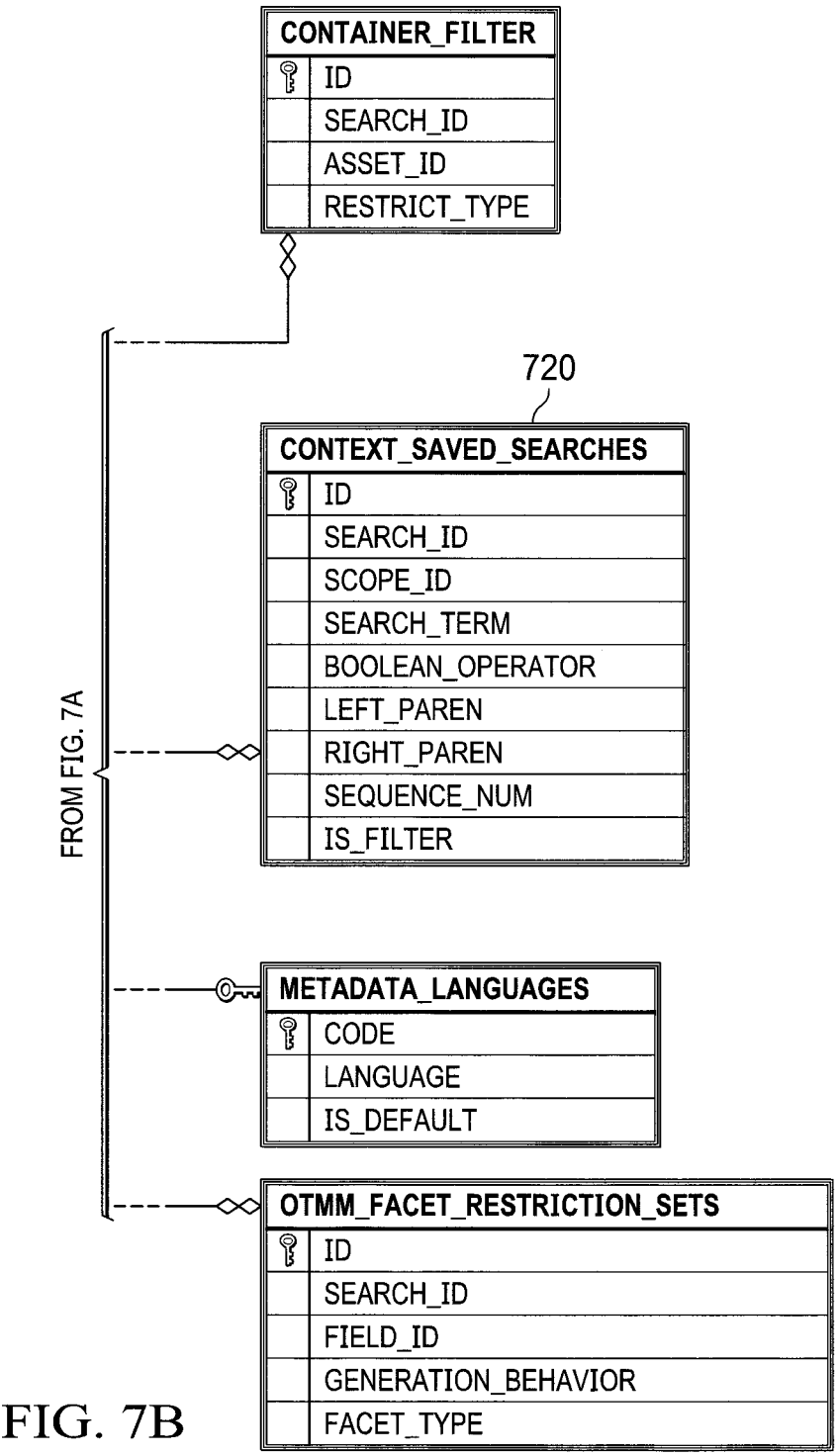

FIGS. 7A and 7B are block diagrams depicting an embodiment of a schema for tables that may be utilized by a content management system to store entity rules or saved searched for entity rules. Specifically, in one embodiment, a saved search for an entity rule may be stored in a set of tables. A SEARCHES table 702 includes an entry for each saved search for an entity rule with an ID for that search. The ID may serve as a key to the other tables, which include a CONDITION_SETS table 710 that includes user entered search criteria. These search criteria may include one or more values for content management or other metadata or data maintained by a content management system and associated expressions (e.g., Boolean operators), such as the group or business unit names or other metadata or data maintained by the content management system for an asset. The CONTEXT_SAVED_SEARCHES table 720 may include keyword search terms and associated expressions that may have been entered by a user. These keyword terms may pertain to the content of the assets and may be contained in, for example, an index created by a search engine of the content management system. A FIXED_CONDITION_SET table 730 may be a table that includes hidden (e.g., from a user) search criteria for the saved search that may be added by the content management system to the save search. These hidden search criteria may be added by the content management system for a host of reasons, including security or access restrictions, reasons of efficiency or speed, administrator configuration, or other reasons.

Although the invention has been described with respect to specific embodiments thereof, these embodiments are merely illustrative, and not restrictive of the invention. The description herein of illustrated embodiments of the invention, including the description, is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

As is known to those skilled in the art, computers can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code, by using application specific integrated circuits, programmable logic devices, field programmable gate arrays, optical, chemical, biological, quantum or nanoengineered systems, components and mechanisms may be used. The functions of the invention can be achieved using distributed, or networked systems, components and circuits. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. As one skilled in the art can appreciate, a computer program product implementing an embodiment disclosed herein may comprise one or more non-transitory computer readable media storing computer instructions translatable by one or more processors in a computing environment.

Thus, the detailed description and the specific examples presented herein, while indicating some embodiments of the invention, are given by way of illustration only and not by way of limitation. Various substitutions, modifications, additions and/or rearrangements within the spirit and/or scope of the underlying inventive concept are possible and will be apparent to those skilled in the art from this disclosure.

APPENDIX

According to certain embodiments, a content manager or "ContentManager" implementation is intended to provide an interface to any arbitrary storage medium. The implementation of the content manager will provide methods for reading, writing, and deleting content within its particular storage medium. Certain of these content managers are specialized types of content managers that provide the ability for the content manager to behave in an asynchronous manner. The asynchronous content manager may be a class (e.g., "AsyncContentManager" class) that extends a parent content manager class (e.g., "ContentManager" class). The parent content manager class may further extend a base content manager class ("BaseContentManager" class).

In one embodiment, the ContentManager class or AsyncContentManager class may include the following methods or interfaces:

getContentStatus

```
ContentStatus getContentStatus (ContentInfo contentToRestore,
ContentDataRequest
    request, ContentData.ContentDataSource
    requestedFormat, java.io.File destinationFile,
    ServerPluginResources resources, java.lang.Object
    additionalInfo) throws BaseTeamsException
```

Returns the current status of the progress of a content restoration initiated by a restoreContent call.
Parameters:
contentToRestore—The ContentInfo object describing the content to restore. ContentInfo object that is supplied refers to the relevant object_stacks record for that content. Fields in the ContentInfo object may correspond to columns in the objects_stacks table. For example, the ContentInfo object may include a name field corresponding to the OBJECT_NAME in the OBJECT_STACKS table. The ContentInfo object may also have a contentPath field corresponding to the OBJECT_NAME_LOCATION field of the OBJECT_STACKS table and specifying the location of the asset. Another field of the ContentInfo object may be a contentMAnagerID field corresponding to the CONTENT_MANAGER_ID field of the OBJECT_STACKS table that indicates that content manager associated with the asset.

request—An optional data request object that may provide additional information about the content. This object may be null. This data comes directly from the issuer of the request and may be used for any arbitrary data that needs to send to a content manager. For example, a content manager that can support extracting segments of time-based content like video, may support specifying in and out timecodes in the request.

requestedFormat—The requested content retrieval format to put the content in. This is may be a request given by, for example a DAM about the final format that the content is needed in. The content manager can ignore the requested format and return the content in any format that is convenient or acceptable. However, in certain embodiments, to increase performance, the content manager will return the content in the requested format.

resources—A resources object that contains references to resources like the SecuritySession and a database connection destination File—In the event the requested format is a file, this parameter will indicate the final location of the file. The content manager may choose to write directly to this file or can return a different file and have the requestor copy/move the file to the final location.

additionalInfo—An optional informational object like a job id that can be used to uniquely identify this restore request. This object may be returned in the subsequent getContentStatus and getRestoredContent calls.
Returns:
A status object indicating progress of the restoration.
Throws:
BaseTeamsException—Thrown if there is an error during the operation.
getRestoredContent

```
ContentData getRestoredContent (ContentInfo contentToRestore,
ContentDataRequest
```

```
request, ContentData.ContentDataSource
requestedFormat, java.io.File destinationFile,
ServerPluginResources resources, java.lang.Object
additionalInfo) throws BaseTeamsException
```

Returns the current status of the progress of a content restoration initiated by the restoreContent call.
Parameters:
 contentToRestore—The ContentInfo object describing the content to restore.
 request—An optional data request object that may provide additional information about the content. This object may be null. This data comes directly from the issuer of the request and may be used for any arbitrary data that needs to send to a content manager. For example, a content manager that can support extracting segments of time-based content like video, may support specifying in and out timecodes in the request.
 requestedFormat—The requested content retrieval format to put the content in. This is may be a request given by, for example a DAM about the final format that the content is needed in. The content manager can ignore the requested format and return the content in any format that is convenient or acceptable. However, in certain embodiments, to increase performance, the content manager will return the content in the requested format.
 resources—A resources object that contains references to resources like the SecuritySession and a database connection.
 destination File—In the event the requested format is a file, this parameter will indicate the final location of the file. The content manager may choose to write directly to this file or can return a different file and have the requestor copy/move the file to the final location.
 additionalInfo—An optional informational object like a job id that can be used to uniquely identify this restore request. This object may be returned in the subsequent getContentStatus and getRestoredContent calls.
Returns:
 A ContentData object containing the content that was read.
Throws:
 BaseTeamsException—Thrown if there is an error during the operation.
 restoreContent

```
restoreContent (ContentInfo contentToRestore, ContentDataRequest
request,
  ContentData.ContentDataSource requestedFormat, java.io.File
  destinationFile, ServerPluginResources resources) throws
  BaseTeamsException, java.io.IOException
```

This method may restore the content for the specified ContentInfo object. The ContentInfo object will provide the information the content manager needs to load the content. The content will be returned in a ContentData object.
Parameters:
 contentToRestore—The ContentInfo object describing the content to restore.
 request—An optional data request object that may provide additional information about the content. This object may be null. This data comes directly from the issuer of the request and may be used for any arbitrary data that needs to send to a content manager. For example, a content manager that can support extracting segments of time-based content like video, may support specifying in and out timecodes in the request.
 requestedFormat—The requested content retrieval format to put the content in. This is may be a request given by, for example a DAM about the final format that the content is needed in. The content manager can ignore the requested format and return the content in any format that is convenient or acceptable. However, in certain embodiments, to increase performance, the content manager will return the content in the requested format.
 resources—A resources object that contains references to resources like the SecuritySession and a database connection.
 destination File—In the event the requested format is a file, this parameter will indicate the final location of the file. The content manager may choose to write directly to this file or can return a different file and have the requestor copy/move the file to the final location.
Returns:
 An optional informational object like a job id that can be used internally to uniquely identify this restore request. This object will be returned in the subsequent getContentStatus and getRestoredContent calls.
Throws:
 BaseTeamsException—Thrown if there is an error during the operation.
 java.io.IOException
 In one embodiment, the ContentManager class or BaseContentManager class may include the following methods or interfaces:
 Initialize

```
void initialize (java.util.Map<java.lang.String,java.lang.String>
attributesMap,
  java.lang.String storageRoot) throws BaseTeamsException
```

A DAM may call this method to initialize a content manager. This method may be called once for every allocation of a content manager. Initialize may be called before any other method of the interface is called.
Parameters:
 attributesMap—A map of key-value pairs. The data may come from an attributes table (e.g., content_managers_attr table). Any data needed during initialization in this table may be placed in the table.
 storageRoot—An optional storage root parameter. This parameter comes from the storage_root column of a table (e.g., content_managers table), and may be null. This value is intended to be used as a way to store any value which the repository content is relative to, such as the root directory of a file system.
Throws:
 BaseTeamsException—Should be thrown by the implementation if the manager cannot be initialized.
 readContent

```
ContentData readContent (ContentInfo contentToRead,
ContentDataRequest request,
  ContentData.ContentDataSource requestedFormat,
  ServerPluginResources resources) throws BaseTeamsException,
  java.io.IOException
```

Reads the content for the specified ContentInfo object. The ContentInfo object will provide the information the content manager needs to load the content. The content will be returned in a ContentData object.
Parameters:
  contentToRead—The ContentInfo object describing the content to read.
  request—An optional data request object that may provide additional information about the content. This object may be null. This data comes directly from the issuer of the request and may be used for any arbitrary data that needs to send to a content manager.
  requestedFormat—The requested content retrieval format to put the content in. This is may be a request given by, for example a DAM about the final format that the content is needed in. The content manager can ignore the requested format and return the content in any format that is convenient or acceptable. However, in certain embodiments, to increase performance, the content manager will return the content in the requested format.
  resources—A resources object that contains references to resources like the SecuritySession and a database connection.
Returns:
  A ContentData object containing the content that was read.
Throws:
  BaseTeamsException—Thrown if there is an error during the operation.
  java.io.IOException
    renameContent

---

ContentInfo renameContent (java.lang.String newName, ContentInfo contentInfo,
    ServerPluginResources resources) throws
    BaseTeamsException, java.io.IOException

---

This method may rename the content for the specified ContentInfo object. The ContentInfo object will provide the details of the content to rename.
Parameters:
  newName—The name of the asset.
  contentInfo—The ContentInfo object describing the content to rename.
  resources—A resources object that contains references to resources like the SecuritySession and a database connection
Throws:
  BaseTeamsException—Thrown if there is an error during the operation.
    java.io.IOException
    storeContent

---

ContentInfo storeContent (ContentInfo contentToStore,
  ContentDataRequest request,
    ServerPluginResources resources) throws BaseTeamsException,
    java.io.IOException

---

This method may store the source content into the content repository.
Parameters:
  contentToStore—The reference object that describes the content to store. The actual content will be stored in or referred to by the contentData field of this ContentInfo object. This object may contain the following non-null attributes: name, id, contentKind, and ContentData. Other attributes may be optional at the time of storage and may not necessarily be set. The ContentData object will contain the actual content to store. The source of the content (e.g., input stream, file, etc.) is determined by, for example, a return value of the getPreferredStorageDataSource call.
  request—An optional data request object that may provide additional information about the content. This object may be null. This data comes directly from the issuer of the request and may be used for any arbitrary data that needs to send to a content manager. For example, a requestor may set an attribute that indicates the requestor is located in the New York office. The content manager can then load the content to a New York file system instead of a London file system.
  resources—A resources object that contains references to resources like the SecuritySession and a database connection.
Returns:
  A reference object that describes the data that was stored in the content repository.
  A sourceReference object may be returned.
Throws:
  BaseTeamsException—Thrown if there is an error during the operation
  java.io.IOException
    getPreferredStorageDataSource
ContentData.ContentDataSource getPreferredStorageDataSource
(ContentData.ContentDataSource existingSource)
This method may be called before each storeContent call. The implementation will be given the existing source (e.g., stream, file, etc.) of the content. The implementation can accept that source or suggest another source. For example, the existing source of data may be an InputStream. The implementation can return the InputStream ContentDataSource indicating that sending the InputStream is acceptable. It may also return a different source like a file source.
Parameters:
  existingSource—Source in which following storeContent should present the content to be stored.
Returns:
  A data source.
  deleteContent
void deleteContent (ContentInfo ref, ContentDataRequest request, ServerPluginResources resources) throws BaseTeamsException, java.io.IOException
This method deletes content. This method may permanently remove the content from the repository.
Parameters:
  ref—The reference object that identifies the content to delete.
  request—An optional data request object that may provide additional information about the content. This object may be null.
  resources—A resources object that contains references to resources like the SecuritySession and a database connection.
Throws:
  BaseTeamsException—Thrown if there is an error during the operation.
  java.io.IOException

What is claimed is:
1. A system, comprising:
   a processor;
   a non-transitory computer readable medium comprising instructions for:
      obtaining an entity rule defining a parameter and a destination storage distinct from a primary storage storing assets managed by the system; and determining a set of managed assets in the primary storage of the system associated with the entity rule by:
  evaluating the assets managed by the system using the parameter defined by the entity rule to determine the set of managed assets are associated with the parameter and the set of managed assets are stored in the primary storage;
  storing the determined set of managed assets in a destination storage associated with the entity rule; and
  causing management metadata associated with each of the set of managed assets to be updated with a destination storage identifier associated with the destination storage, wherein the management metadata includes an asset identifier for that asset as stored in the destination storage.

2. The system of claim 1, wherein the parameter is a search query including the parameter.

3. The system of claim 1, wherein the destination storage is a cloud based storage location.

4. The system of claim 1, wherein storing the determined set of managed assets comprises accessing the destination storage through a connector configured for a type of the destination storage.

5. The system of claim 1, wherein the management metadata includes an identifier of the connector for the type of the destination storage.

6. The system of claim 1, wherein the destination storage is defined by the entity rule.

7. The system of claim 1, wherein the parameter is associated with content of an asset, a campaign associated with an asset or an expiration time associated with the asset.

8. A method for managing the distributed storage of managed content, comprising:
obtaining an entity rule defining a parameter and a destination storage distinct from a primary storage storing assets managed by the system; and
  determining a set of managed assets in the primary storage of the system associated with the entity rule by:
    evaluating the assets managed by the system using the parameter defined by the entity rule to determine the set of managed assets are associated with the parameter and the set of managed assets are stored in the primary storage;
    storing the determined set of managed assets in a destination storage associated with the entity rule; and
    causing management metadata associated with each of the set of managed assets to be updated with a destination storage identifier associated with the destination storage, wherein the management metadata includes an asset identifier for that asset as stored in the destination storage.

9. The method of claim 8, wherein the parameter is a search query including the parameter.

10. The method of claim 8, wherein the destination storage is a cloud based storage location.

11. The method of claim 8, wherein storing the determined set of managed assets comprises accessing the destination storage through a connector configured for a type of the destination storage.

12. The method of claim 8, wherein the management metadata includes an identifier of the connector for the type of the destination storage.

13. The method of claim 8, wherein the destination storage is defined by the entity rule.

14. The method of claim 8, wherein the parameter is associated with content of an asset, a campaign associated with an asset or an expiration time associated with the asset.

15. A non-transitory computer readable medium, comprising instructions for:
obtaining an entity rule defining a parameter and a destination storage distinct from a primary storage storing assets managed by the system; and
  determining a set of managed assets in the primary storage of the system associated with the entity rule by:
    evaluating the assets managed by the system using the parameter defined by the entity rule to determine the set of managed assets are associated with the parameter and the set of managed assets are stored in the primary storage;
    storing the determined set of managed assets in a destination storage associated with the entity rule; and
    causing management metadata associated with each of the set of managed assets to be updated with a destination storage identifier associated with the destination storage, wherein the management metadata includes an asset identifier for that asset as stored in the destination storage.

16. The non-transitory computer readable medium of claim 15, wherein the parameter is a search query including the parameter.

17. The non-transitory computer readable medium of claim 15, wherein the destination storage is a cloud based storage location.

18. The non-transitory computer readable medium of claim 15, wherein storing the determined set of managed assets comprises accessing the destination storage through a connector configured for a type of the destination storage.

19. The non-transitory computer readable medium of claim 15, wherein the management metadata includes an identifier of the connector for the type of the destination storage.

20. The non-transitory computer readable medium of claim 15, wherein the destination storage is defined by the entity rule.

21. The non-transitory computer readable medium of claim 15, wherein the parameter is associated with content of an asset, a campaign associated with an asset or an expiration time associated with the asset.

* * * * *